US010339475B1

(12) United States Patent
Krishnan et al.

(10) Patent No.: US 10,339,475 B1
(45) Date of Patent: Jul. 2, 2019

(54) LOOSELY COUPLED APPLICATIONS LIFECYCLE METHODOLOGY

(75) Inventors: Gopal Krishnan, Austin, TX (US); Christopher Sanchez, Austin, TX (US); Matthew Sanchez, Round Rock, TX (US); Steven Teleki, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 3375 days.

(21) Appl. No.: 11/455,951

(22) Filed: Jun. 20, 2006

(51) Int. Cl.
*G06Q 10/06* (2012.01)
(52) U.S. Cl.
CPC ......... *G06Q 10/06* (2013.01); *G06Q 10/0631* (2013.01)
(58) Field of Classification Search
None
See application file for complete search history.

(56) References Cited

U.S. PATENT DOCUMENTS

| 6,334,131 | B2* | 12/2001 | Chakrabarti et al. | |
|---|---|---|---|---|
| 7,013,290 | B2* | 3/2006 | Ananian | 705/27 |
| 7,356,559 | B1* | 4/2008 | Jacobs et al. | 709/203 |
| 2002/0128953 | A1* | 9/2002 | Quallen et al. | 705/37 |
| 2003/0233397 | A1* | 12/2003 | Katz et al. | 709/200 |

* cited by examiner

*Primary Examiner* — Thomas L Mansfield
(74) *Attorney, Agent, or Firm* — Scully, Scott, Murphy & Presser, P.C.; Robert Shatto, Esq.

(57) ABSTRACT

A SOBA lifecycle methodology is provided for assembling and maintaining service-oriented business applications (SOBAs) for effective functionality and interoperability. SOBAs are loosely coupled business processes and applications in which all functions are defined as independent, semantically-aware business services, with distributed assembly from a global chain of providers. One useful prerequisite for the methodology is analyzing the associated SOA (service-oriented architecture) strategy and infrastructure such as the hardware, software, human resources, and deployment strategy. A second prerequisite is analyzing the associated SOA governance process for how all the resources of the SOBA will work together. Governance refers to design, release, run-time, and manage-time functions. The SOBA lifecycle methodology comprises selecting business functions and processes for the SOBA; populating a business services catalog with information about the SOBA and its components; developing and configuring the SOBA; testing and deploying components of the SOBA; setting up and operating the SOBA; and maintaining the SOBA.

23 Claims, 7 Drawing Sheets

LOOSELY COUPLED APPLICATIONS LIFECYCLE METHODOLOGY

RELATED APPLICATION

This application claims the benefit of Provisional Patent Application No. 60/695,703 filed on Jun. 30, 2005 by the present inventors.

FIELD OF THE INVENTION

This innovation relates to electronic business services, and, more particularly, to automated methods for assembling and maintaining service-oriented business applications (SO-BAs).

BACKGROUND OF THE INVENTION

Web Services

The promise of the Internet is an open e-business platform where companies can do business spontaneously with anyone, anywhere, and anytime without requiring that companies abandon their existing software applications and infrastructures. Increasingly companies rely on the Internet to obtain loosely coupled Web services. Web services are typically deployed by Web service providers on application-based servers, which are computers on networks that mange the networks.

Web services are business-enterprise computer applications that can be utilized singly or collectively to accomplish a wide range of intended purposes, such as determining health-care patients' eligibility for benefits, submitting health-care claims, and providing stock quotes. Web services help companies dramatically cut costs, increase revenues, and improve competitive agility by combining existing, heterogeneous systems into cross-functional, multi-company applications. For example, Web services designed for insurance companies help them rapidly automate their business processes, eliminating paper and manual touches and saving them tens of millions of dollars annually. To supply such valuable and widely needed services, Web services providers may offer multiple Web services to client businesses.

Because Web services can operate independently of a particular computer language, platform, or location, a client business and a Web service may each use different computer languages, platforms, and locations in widely distributed systems over one or more networks.

Open Web Service Standards

Open Web service standards have been developed for compatibility among Web service applications. These standards typically apply at the wire protocol level, where protocols are defined to establish physical links among Web services. For example, a standard called SOAP (Simple Object Access Protocol) has been developed to define the format of messages exchanged among applications. The content of messages, such as a request for an action to be performed by a Web service, is currently described in WSDL (Web Services Description Language), which is an XML (Extensible Markup Language)-formatted language and which serves as a Web service's interface. Web services are cataloged in a Web-based directory and infrastructure called UDDI (Universal Description, Discover and Integration), which is an Internet registry where businesses list themselves according to their services. Communications between a client business and a Web service further rely on the use of a shared transport protocol, such as HTTP (Hypertext Transport Protocol), which enables communications over the Internet.

Typically a client business employs a client application to communicate from its Web site over the Internet according to the standards given above, to obtain the Web services offered by a Web service provider from its server-based Web site. The Web service provider uses the same standards to reply to a client. Other known or not-yet-known Web service protocols and standards may be used for this communications.

The Web service end point is the physical location of the Web service on a server and implements the Web service interface.

Web Service Applications

Web service applications are computer applications that use Web services singly or collectively to accomplish intended purposes. To work with a specific Web services application, a Web service needs accept business documents, process them, and pass them on in ways compatible with the Web service application.

A Web service application typically consists of one or more Web services, a document that describes how those Web services are to be used, portal Web pages, and UDDI entries.

Business Services

A business service is an aggregation of industry business components and third party business services that provides business functions and processes to a subscriber, which may be a human or a machine. Business services may include Web services and applications.

Example of Business Services

FIG. 1 shows an example of how a business service may comprise multiple services as part of an application for the filing and payment of medical insurance claims. Chained services are loosely connected services that may reside on different servers and that may be provided by separate businesses. A service provider employs a server 100 running a portal Web page 200 and an application 300.

A portal Web page 200 is a Web site interface that a person can reach over the Internet. Web site interfaces are computer-programmed modules that allow end-users to select variables and parameters from easy-to-use visual displays or to type in this input, save the information through selecting a save option, and have their selections automatically applied by computer subsequently, without those users having to program the information manually.

In this example, an attendant at a clinic computer 150 can use the Internet, through a wired link 144, a telephone network 130, and another wired link 142, to reach the portal Web page 200 on the service provider server 100. The attendant can then use the portal Web page 200 to fill out a claim file form 220 for one of the clinic's patients and submit it to service application 1 300.

Other means for submitting claims also exist. For example, an attendant at a clinic computer 150 might use link 144, network 130, and link 142 for a machine-to-machine transmission of a claim file directly to application 1 300. Many kinds of wired and unwired links and networks could be used for this machine-to-machine transmission, such as the Internet, a private LAN (Local Area Network), a wireless network, a TCP/IP (Transmission Control Protocol/Internet Protocol) network, or other communications system.

To continue with the example, application 1 300 receives each claim file through service 1 410, which relays the data back over link 142, network 139, and link 143 to server 2

182. If necessary, service 2 420 transforms the format of the claim file to a format that application 1 300 can use for its full operations. For example, a claim file might have been sent in NSF (National Standard Format) format, but application 1 300 might require HIPAA (Health Insurance Portability and Accountability Act) format.

After the claim file is transformed to the correct message format, service 2 420 relays the data back over link 143, network 139, and link 145 to service 3 430, which is used to validate the claim file. In turn, service 3 430 relays the data back over link 145, network 139, and link 147 to service 4 440, which is used to send the claim file back over link 147, network 130, and link 148 to an insurance company server 170 for payment to the clinic.

For application 1 300 to carry out its operations successfully, the chained services 410, 420, 430, and 440 must be compatible and functional. However, when services 410, 420, 430, and 440 are on the servers of different service providers, they may not have been set up with compatible communication dimensions, which can make interoperability among them impossible. Moreover, if one service is dysfunctional, the chain may be broken and the operations blocked.

Problems with Coupling Virtualized Resources

Virtualized resources, such as Web services, Web-service applications, and business services, are becoming the basis for electronic commerce of all forms.

To employ virtualized resources comprising multiple elements, such as different business services, programmers need to integrate them efficiently. Before the Internet, users who were partners of an enterprise had to establish one-to-one communications with that enterprise, which entailed a large amount of preparatory work. For example, the two business entities had to establish their prices, contracts, and connections for transmitting information each time. With the Internet, some of the basic work for establishing such connections is done through browsers.

However, much preparatory work must still be done to fully bring the partners of an enterprise into a business ecosystem. A business ecosystem comprises a network of business relationships in a specific business area, such as a system using multiple services for the electronic filing of insurance claims for patients' treatments, as shown in FIG. 1.

For example, to file a patient's insurance claim, an operator at clinic computer 150, shown in FIG. 1, might have to complete the following steps:
1. Opening a Web browser;
2. Going to the correct URL for filing the claim;
3. Opening the correct form for filing the claim; and
4. Typing in, or copying and pasting in, the required information about the claim, such as the user's name, address, and insurance company policy number, and the type, location, and date of the treatment, The system of services for filing the claim also typically requires time-consuming work by employees to operate efficiently, for example in the following areas:
Authorization for filing the claim;
Setting up client or patient accounts and profiles;
Personalizing communications with clients, for example so that messages sent to a client are in the client's preferred format; and
Monitoring the performance of the system.

The increasing reliance of businesses on such ecosystems of services has dramatically increased the demand on those ecosystems. To meet this demand, businesses have typically developed many different software methodologies for specific and independent business services and have not addressed loosely coupled, multi-organizational interoperability among business services. As a result, businesses have often been forced to hire more and more employees to develop and implement these methodologies, but this solution is labor intensive and expensive.

Therefore there is a need for a method that provides a logical and more effective process for assembling, maintaining, and tightly controlling loosely connected business services that is repeatable, reliable, and trainable (scalable).

BRIEF SUMMARY OF THE INVENTION

These and other needs are addressed by the present invention. The following explanation describes the present invention by way of example and not by way of limitation.

It is an aspect of the present invention to provide a logical and more effective process for assembling, maintaining, and tightly controlling loosely connected business services that is repeatable, reliable, and trainable (scalable).

This and other aspects, features, and advantages are achieved according to the method of the present invention. In accordance with the present invention, a SOBA lifecycle methodology is provided for assembling and maintaining service-oriented business applications (SOBAs) for effective functionality and interoperability. SOBAs are loosely coupled business processes and applications in which all functions are defined as independent, semantically-aware business services, with distributed assembly from a global chain of providers. One useful prerequisite for the methodology is analyzing the associated SOA (service-oriented architecture) strategy and infrastructure such as the hardware, software, human resources, and deployment strategy. A second prerequisite is analyzing the associated SOA governance process for how all the resources of the SOBA will work together. Governance refers to design, release, run-time, and manage-time functions. The SOBA lifecycle methodology comprises selecting business functions and processes for the SOBA; populating a business services catalog with information about the SOBA and its components; developing and configuring the SOBA; testing and deploying components of the SOBA; setting up and operating the SOBA; and maintaining the SOBA.

BRIEF DESCRIPTION OF THE DRAWINGS

The following embodiment of the present invention is described by way of example only, with reference to the accompanying drawings, in which.

DETAILED DESCRIPTION

The details of the following explanation are offered to illustrate the present invention clearly. However, it will be apparent to those skilled in the art that the concepts of present invention are not limited to these specific details. Commonly known elements are also shown in diagrams for clarity, as examples and not as limitations of the present invention. Furthermore, the order of processes, their numbered sequences, and their labels are presented for clarity of illustration and not as limitations on the present invention.

Operating Environment

Figure 1:
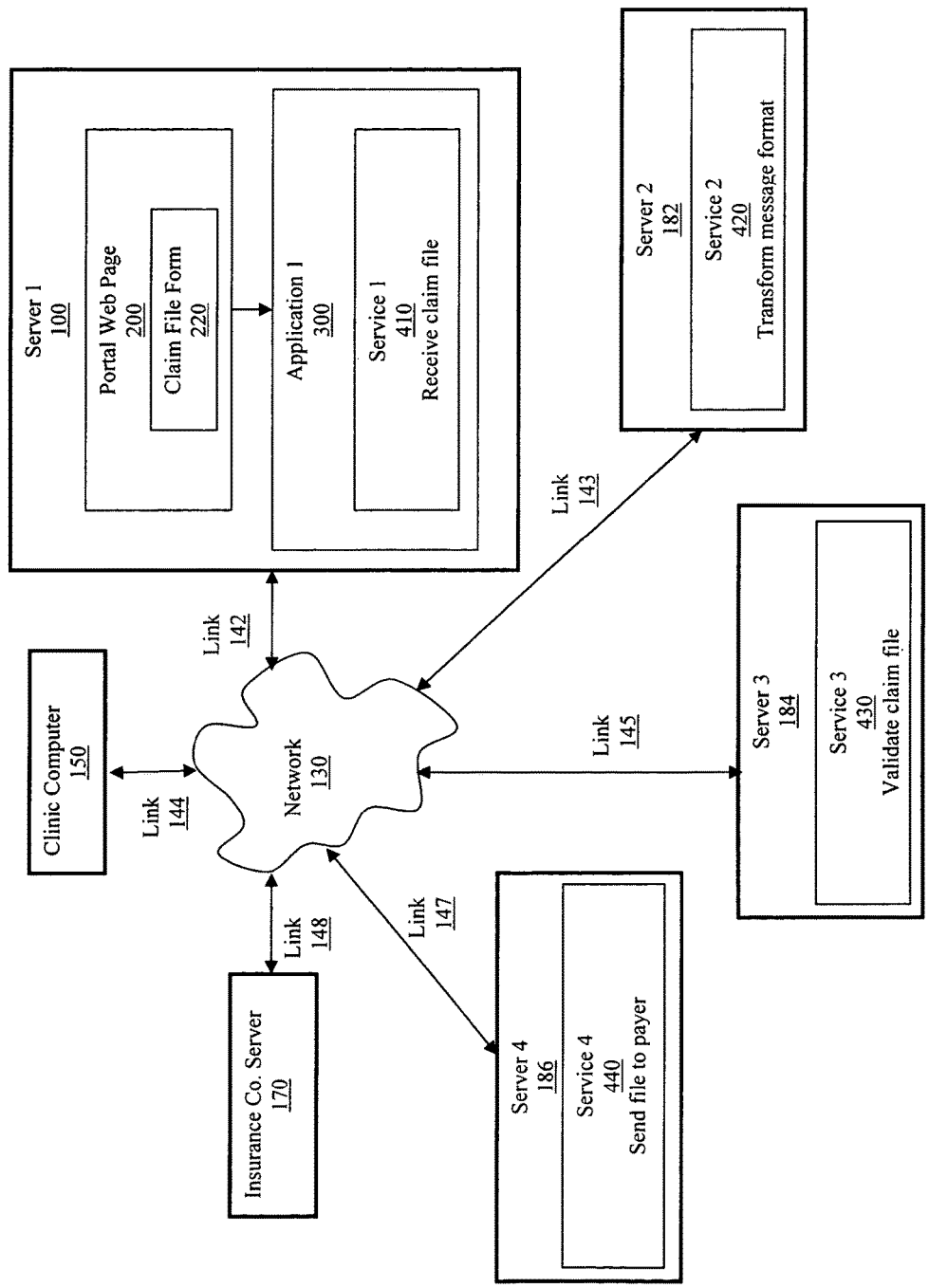
FIG. 1 is a block diagram showing an example of loosely connected services used by an application for filing patient claims.

The method of the present invention may be used for the integration of virtualized business applications on at least one application-based server and potentially on many loosely coupled servers, as shown in FIG. 1 and explained above.

SOBAs

SOBAs (service-oriented business applications) are loosely coupled business processes and applications in which all functions are defined as independent, semantically-aware business services. SOBAs use a modular approach in which small, loosely coupled pieces of business services, each derived from a freestanding application, are published, consumed, and combined with other applications.

SOBAs dynamically integrate people, processes, and information across application and enterprise boundaries, helping businesses:
  Automate inter and intra-enterprise processes;
  Expand channels with existing and new partners;
  Generate new and enhanced revenue;
  Manage and control outsourced processes; and
  Allow flexible business models;
while
  Leveraging and extending existing IT investment;
  Mitigating risks via incremental automation and staged investments;
  Reducing complexity of past architectures; and
  Reducing total cost of ownership.

Figure 2:
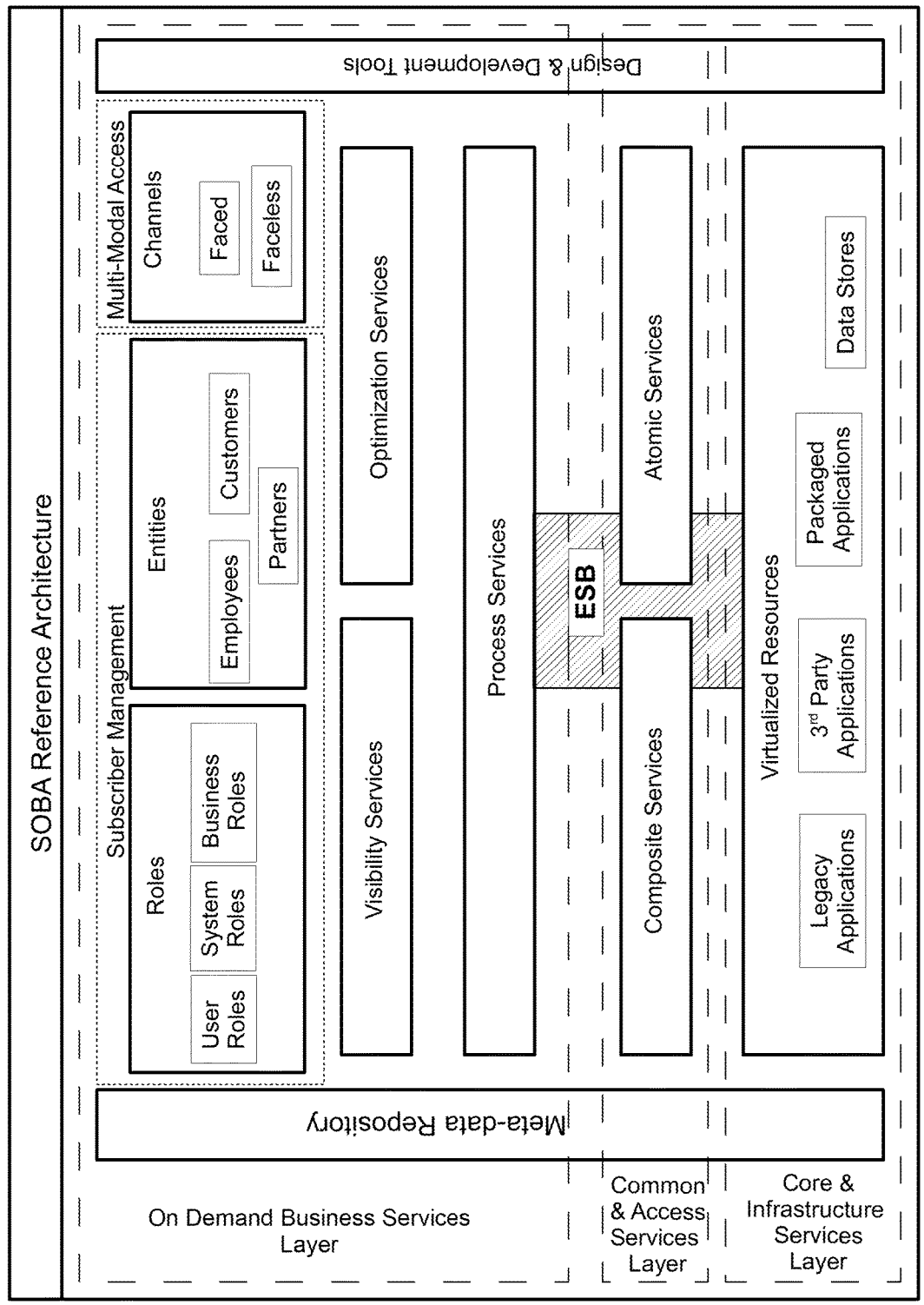
FIG. 2 is a block diagram showing an example of a SOBA reference architecture.

FIG. 2 illustrates a SOBA reference architecture, comprising the following elements:
  On-Demand Business Services Layer
  Subscriber management,
    Roles,
      User roles,
      System roles,
      Business roles,
    Entities,
      Employees,
      Customers,
      Partners,
  Multi-modal access,
    Channels,
      Faced,
      Faceless
  Visibility services,
  Optimization services,
  Process services,
  Common and Access Service Layer
  Composite services,
  Atomic services,
  Core and Infrastructure Services Layer
  Virtualized resources,
    Legacy applications,
    $3^{rd}$ party applications,
    Packaged applications,
    Data stores,
  A meta-data repository,
  Design and development tools
SOBA Lifecycle Methodology The present invention's SOBA lifecycle methodology is a logical method of effectively assembling, maintaining, and tightly controlling the elements required for a SOBA.

Preferred Prerequisites

Figure 3:
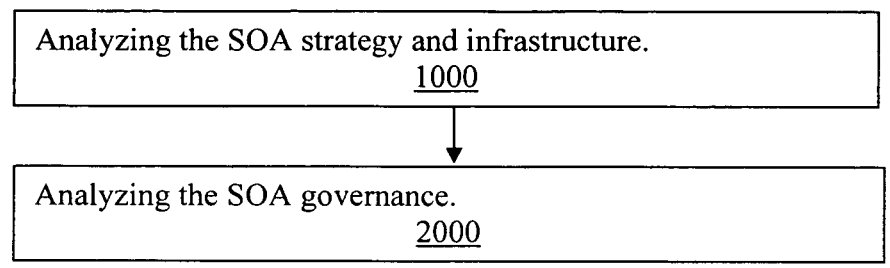
FIG. 3 is a flow chart that shows two high level steps that are preferred prerequisites for the present invention's SOBA lifecycle methodology.

FIG. 3 shows two high level steps that are preferred prerequisites for the present invention's SOBA lifecycle methodology in an embodiment.

Step 1000—Analyzing the SOA strategy and infrastructure.

The SOA (Service-Oriented Architecture) strategy and infrastructure refers to the architecture, meaning the set of resources, to be used with a SOBA. These resources may comprise hardware, software, human resources, and deployment strategy. Every industry may have its own strategy and infrastructure.

Step 2000—Analyzing the SOA governance.

The SOA governance refers to how all the resources of a SOBA will work together at the to accomplish the tasks of that SOBA.

Analyzing the SOA Strategy and Infrastructure

Figure 6:
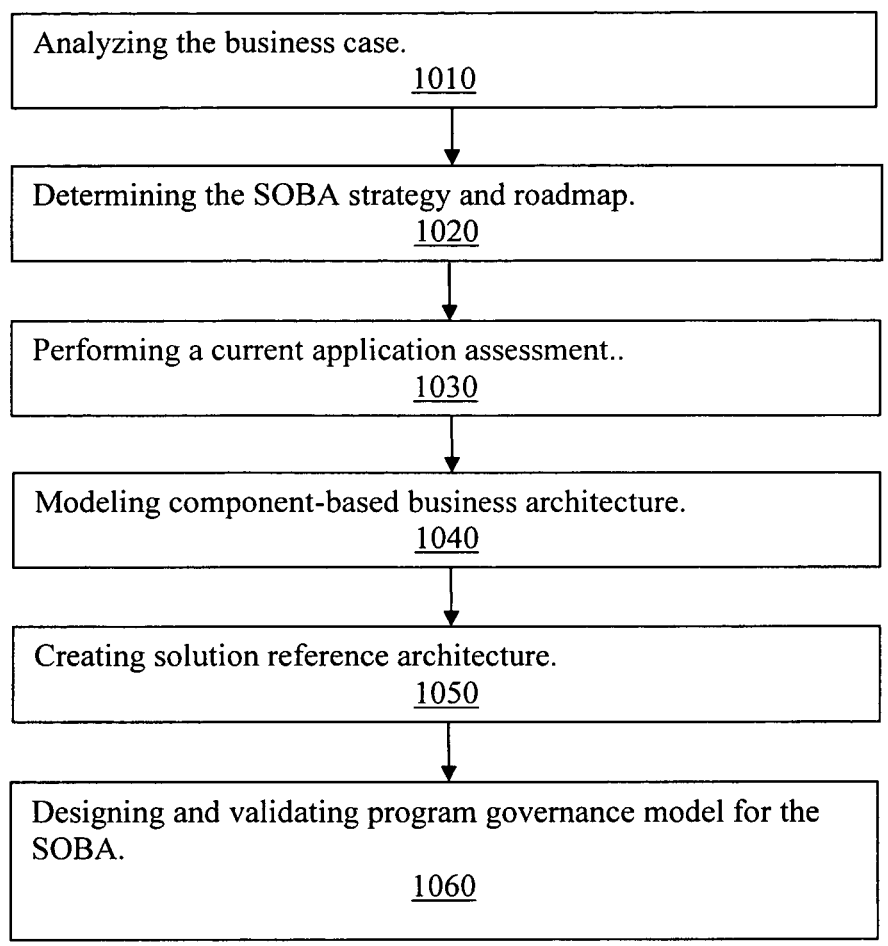
FIG. 6 is flow chart that shows steps for analyzing the SOA strategy and infrastructure.

In an embodiment shown in FIG. 6, the following steps may be employed to determine the resources to be used with a SOBA:

Step 1010—Analyzing the business case.
  This step refers to analyzing the overall requirements, costs, and goals of the SOBA, comprising
    Identifying the transformation business problem to be solved;
    This has to do with transformation of existing resources that will be required for the SOBA.
    Determining the IT (information technology) investment required; and
    Defining the business targets to be achieved.
Step 1020—Determining the SOBA strategy and roadmap.
  This refers to devising the best general strategy for integrating and deploying the SOBA. The roadmap is the condition-bound sequencing of steps involved. This step broadly comprises
    Determining high level IT goals and the sequencing of those goals; and
    Identifying at a high level the candidate services to be retained or replaced in the SOBA.
    For example, candidate services using code that is too old for the current requirements of the SOBA may need to be replaced.
Step 1030—Performing a current application assessment.
  This refers to conducting a detailed analysis of the applications available for potential use in the SOBA, comprising
    Inventorying current applications; and
    Creating an application, maintenance, renovation, and replacement plan
Step 1040—Modeling component-based business architecture.
  This step refers to performing a business analysis to compare the component requirements of the SOBA with the existing architecture, that is, the overall resources, for the SOBA. It further involves prioritizing the required components for the SOBA and mapping them, typically graphically, to show the existing resources that can accomplish them.
Step 1050—Creating solution reference architecture.
  This step refers to creating, at a high level, a method to show how the different resources for the SOBA are to be used and methods to accomplish the integration of those resources. It involves
    Designing high level business, application, and technical component architectures;

Mapping to show the existing component solutions vs. the new component solutions that must be created; and Creating templates and implementation middleware for the deployment of all components.

Step 1060—Designing and validating program governance model for the SOBA.

This step involves planning how all the elements of the SOBA will work together. It may further involve Establishing a physical program office for the SOBA, and Establishing a technical governance model and team, showing how the SOBA is to be managed and which resources will be employed for management components.

Analyzing the SOA Governance

Figure 7:
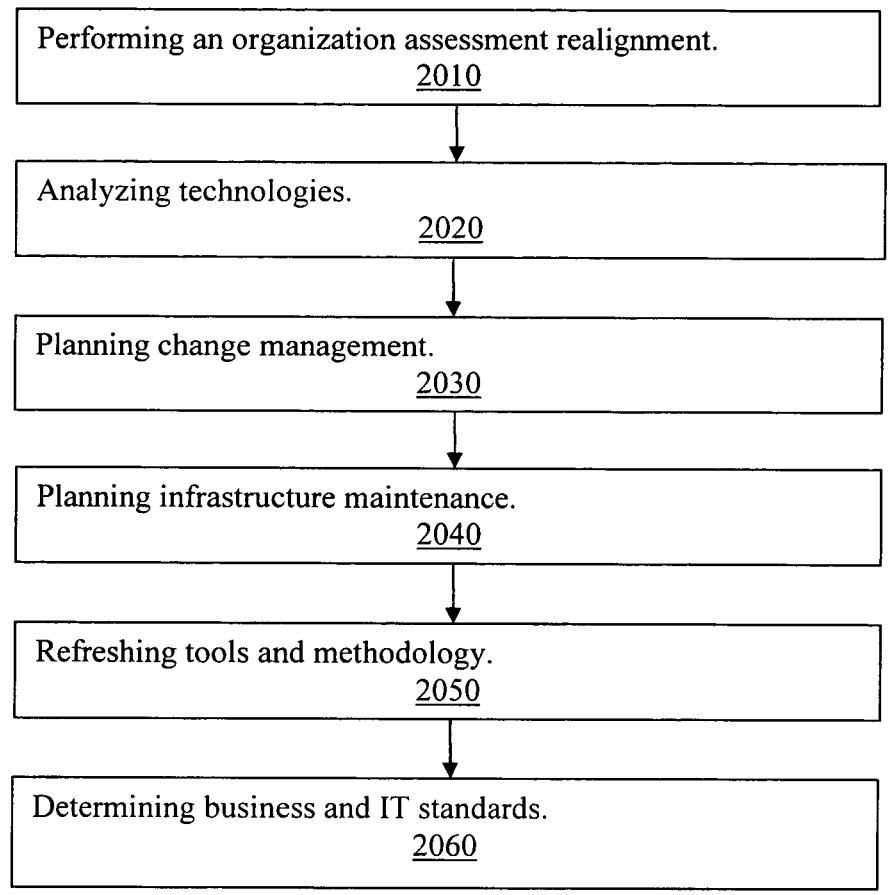
FIG. 7 is flow chart that shows steps for analyzing the SOA governance.

In an embodiment shown in FIG. 7, analyzing the SOA governance comprises the following steps:

Step 2010—Performing an organization assessment realignment.

The existing resources for a SOBA are assigned appropriate roles for the SOA. This involves Establishing and/or maintaining program teams; and Planning and/or executing operational organization change.

Step 2020—Analyzing technologies.

This involves

Determining needs for new technologies;

Adopting those new technologies; and

Accepting, modifying, or rejecting the program technical approach.

The program technical approach refers to the tools, methodologies, and software languages to be used for the SOA. For example, an analysis is made of whether to standardize a SOBA software language to be Java or DB2, or to be JSP or Portal.

Step 2030—Planning change management.

This step involves

Evaluating the technical and business viability of solution components for changes;

Determining the impact of changes on solution components; and

Making decisions on whether to change or maintain solution components.

Step 2040—Planning infrastructure maintenance.

This involves

Assessing implementation efficiency; and

Modifying operations and technology to optimize them.

For example, planning should be made for acquiring and maintaining file licenses. Plans should also be established for when to consolidate servers with excess capacity and for when to divide functions among additional servers when capacities are strained.

Step 2050—Refreshing tools and methodology.

This step involves a continual governance process review at specified time intervals to promote effectiveness, comprising Assessing operations and IT effectiveness; and Modifying and updating tools for optimization.

Step 2060—Determining business and IT standards.

This refers to selecting standards for reference architecture or technology to ensure interoperability. For example, the ACORD format may be selected for insurance transactions. The ACORD format is a type of XML format developed by the Association for Cooperative Operations Research and Development (ACORD), a nonprofit insurance association whose mission is to facilitate the development and use of standards for the insurance, reinsurance and related financial services industries. This step comprises Determining the business value and operational impact of standards;

Mapping standards to the technical approach and components; and

Aligning the resources for the SOA through the adoption of the selected standards.

SOBA Governance

Note that the macro-level SOA governance process described above influences the micro-level SOBA lifecycle methodology described below. A related governance process applies to the how all the resources of a SOBA will work together to accomplish the tasks of that SOBA. For example, governance steps should be carried out before any changes to the SOBA are implemented. This governance process depends on the type of element changed and the type of change.

The SBOA governance comprises the following general functions:

Design,

Release,

Run-time, and

Manage time.

The SOBA Lifecycle Methodology

Figure 4:
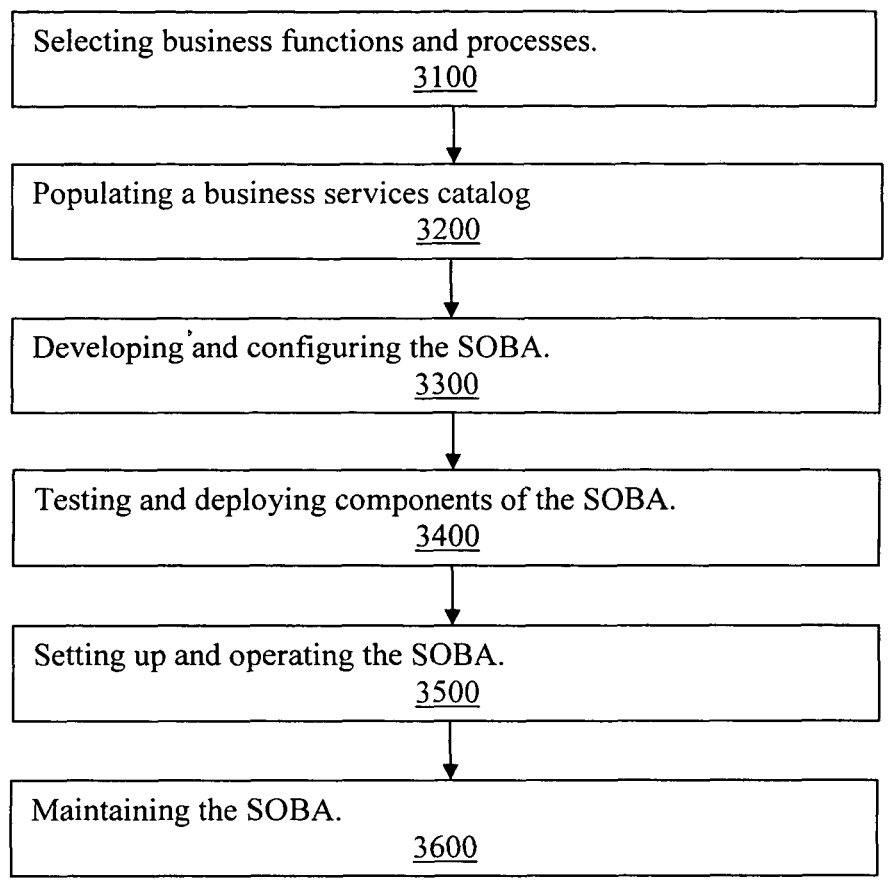
FIG. 4 is flow chart that shows steps for a SOBA lifecycle methodology.

The SOBA lifecycle refers to the deployment of a SOBA over time. The present invention provides the following steps for assembling, controlling, and maintaining a SOBA over time, as shown in FIG. 4.

Step 3100—Selecting business functions and processes;

Step 3200—Populating a business services catalog;

Step 3300—Developing and configuring the SOBA;

Step 3400—Testing and deploying components of the SOBA;

Step 3500—Setting up and operating the SOBA; and

Step 3600—Maintaining the SOBA.

Selecting Business Functions and Processes

This step involves

Analyzing business process and function;

Selecting common business functions and similar business functions;

This process has to do with selecting components for the SOBA with common and similar needs and resources.

Identifying current capabilities that can be re-used or re-purposed for use in SOBAs primarily from backends e.g. "rating";

Building a portfolio of services from existing capabilities;

Adding new services to the SOBA portfolio from third party sources or internal development; and Publishing the SOBA portfolio in the business services catalog.

This process has to do with publishing information about the SOBA according to a pre-configured ontology for the domain, which classifies components by their relationships. The published information also shows the attributes of the SOBA and its components. The information is published in a business storage catalog, which may storage on at least one server.

Populating a Business Services Catalog

This step involves designing Web and/or business services for the SOBA and providing high level descriptions of those services. It comprises Defining SOBAs and business services; For example a rendition such as a chip diagram of the SOBA and its business services may be provided.

Classifying the business services;

For example, business services may usefully be classified as access, process, visibility, common, and optimization services.
Extending the classification ontology as needed;
Publishing the SOBA and its business services into the business services catalog;
Assigning metadata for the SOBA and its business services;
This process refers to identifying attributes about components that are employed to make them functional and interoperable in the SOBA. For example, identifiers may be added to specify modes of access for business services, timeouts, document formats, and types of services, such as access and process services.
Assigning role types, business events and exceptions;
Identifying additional third-party services and Web services;
Identifying ecosystem partners;
A business ecosystem comprises a network of business relationships in a specific business area, such as a system using multiple services for the electronic filing of insurance claims for patients' treatments, as shown in FIG. 1.
Developing test harnesses for components of the SOBA.

Developing and Configuring the SOBA

Figure 5:
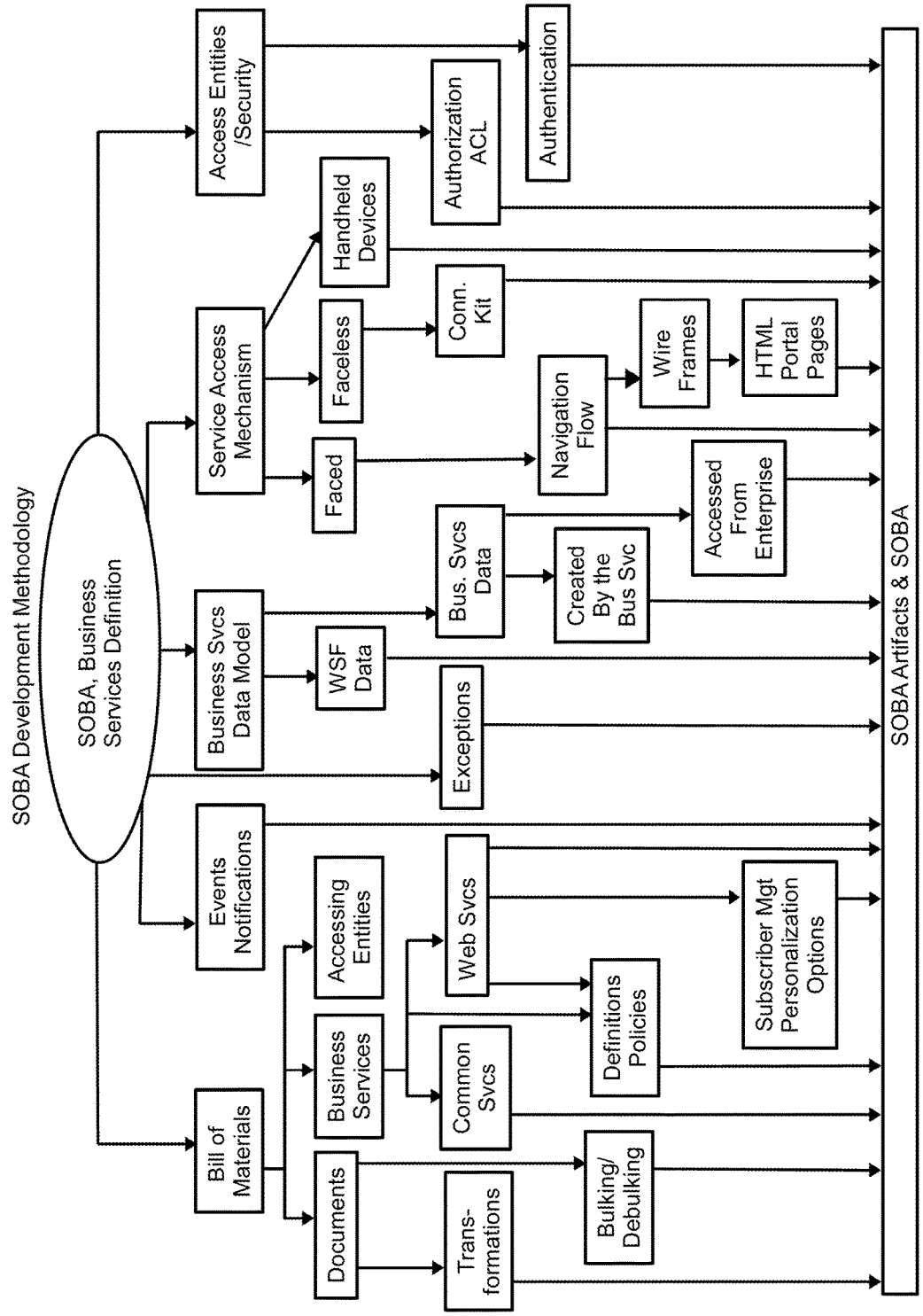
FIG. 5 is a block diagram that shows types of information required to develop and configure a SOBA.

FIG. 5 shows types of information required to develop and configure a SOBA, comprising the following chain in an embodiment:
Bill of materials
  Documents
    Transformation
    Bulking/debulking
  Business Services
    Common services
    Definition/policies
    Web services
      Subscriber management personalization options
    Accessing entities
  Events notifications
  Exceptions
  Business Services data model
    WSF data
    Business services data
      Created by the business service
      Accessed from enterprise
  Service access mechanism
    Faced
      Navigation flow
    Faceless
      Conn. kit
    Handheld devices
  Access entities/security
    Authentication
    Authorization ACL The step for developing and configuring a SOBA comprises
Developing Web services, and portlets;
Developing BPELs (business process executive languages) programs;
Developing business services;
Developing test harnesses;
Publishing events and exceptions;
Assigning business policies;
Defining and characterizing personalizable dimensions;
Assigning business policies; and
Defining and characterizing personalizable dimensions.
Developing the orchestration of services.

Testing and Deploying Components of the SOBA
This step comprises
Deploying components in a test environment;
Performing completeness testing using simulated endpoints;
Connecting to production services;
Testing functionality;
This refers to testing capabilities.
Testing policies, events and exceptions, and personalization;
Performing non-functional testing;
This refers to testing of features other than capabilities, for example performance features such as speed, capacity, and robustness.
Deploying in a production environment; and
Assigning production endpoints for services published in the business services catalog;

Setting Up and Operating the SOBA
This step involves
Assigning business policies;
A business policy is an assertion about a specific business context for specifying constraints and business goals that need to be met at run time.
Creating organizations; roles, and users;
For example, organizations may identified as end-users or partners, with appropriate access to and control of certain components and features.
Assigning business SLAs (service level agreements);
Self or delegated provisioning of business services; and
Personalization of business services.

Maintaining the SOBA
This step involves monitoring the SOBA, measuring its effectiveness, and providing reports on performance. It comprises
Monitoring business SLAs;
Monitoring transactions;
Managing events and exceptions;
Measuring key business metrics;
Adjusting policies as needed;
Reporting on performance;
Adjusting policies as needed; and
Changing management.

What is claimed is:

1. A computer-implemented lifecycle method for assembling, operating, and maintaining a service-oriented business application comprised of multiple distributed services operating on multiple distributed computer servers connected over the Internet, the method comprising:
determining a service-oriented architecture strategy and infrastructure associated with the service-oriented business application;
analyzing by a programmable computer the service-oriented architecture strategy and infrastructure to identify a set of resources to be used with the service-oriented business application;
determining a service-oriented architecture governance process associated with the service-oriented business application;
at a first of the computer servers, one of the services of the business application, running on the first of the computer servers, receiving input, over the Internet, to a specified file;
at the first of the computer servers, the one of the services submitting the file, via the Internet, to another one of the services of the business application, running on a second of the computer servers, for processing; and analyzing by the programmable computer the service-oriented architecture governance process to determine how all the set of resources of the service-oriented business application will work together to accomplish the tasks of the service-oriented business application;
wherein analyzing by the programmable computer the service-oriented architecture strategy and infrastructure further comprises:
    analyzing a business case;
    determining a service-oriented business application strategy and roadmap;
    performing a current application assessment;
    modeling a component-based business architecture for the service-oriented business application;
    creating solution reference architecture; and
    designing and validating program governance model for the service-oriented business application.

2. The method of claim 1 further comprising using a service-oriented business application reference architecture for performing the prerequisites, the service-oriented business application reference architecture comprising:
    an on-demand business services layer;
    a common and access service layer; and
    a core and infrastructure services layer.

3. The method of claim 1, wherein analyzing the business case further comprises identifying a transformation business problem to be solved;
    determining the information technology investment required; and
    defining business targets to be achieved.

4. The method of claim 1, wherein determining a service-oriented business application strategy and roadmap further comprises
    determining high level information technology goals and the sequencing of those goals; and
    identifying candidate services to be retained or replaced in the service-oriented business application.

5. The method of claim 1, wherein performing a current application assessment further comprises
    inventorying current applications; and
    creating an application maintenance, renovation, and replacement plan.

6. The method of claim 1, wherein determining modeling component-based business architecture further comprises
    performing a business analysis to compare the component requirements of the service-oriented business application with the with the component-based business architecture;
    prioritizing the required components for the service-oriented business application;
    and mapping the required components to show existing resources.

7. The method of claim 1, wherein creating solution reference architecture further comprises
    designing high level business, application, and technical component architectures;
    mapping to show the existing component solutions and new component solutions that must be created; and
    creating templates and implementation middleware for the deployment of all components.

8. The method of claim 7 wherein designing and validating program governance model for the service-oriented business application further comprises
    establishing a physical program office for the service-oriented business application; and
    establishing a technical governance model and team; and
    describing how the service-oriented business application is to be managed and which resources will be employed for management components.

9. The method of claim 1 wherein analyzing the service-oriented architecture governance process to determine how all the resources of the service-oriented business application will work together further comprises
    performing an organization assessment realignment;
    analyzing technologies; planning change management;
    planning infrastructure maintenance;
    refreshing tools and methodology; and
    determining business and information technology standards.

10. The method of claim 9 wherein performing an organization assessment realignment further comprises
    establishing and maintaining program teams; and
    planning and executing operational organization change.

11. The method of claim 9 wherein analyzing technologies further comprises determining needs for new technologies;
    adopting the new technologies; and
    accepting, modifying, or rejecting a program technical approach.

12. The method of claim 9 wherein planning change management further comprises evaluating the technical and business viability of solution components for changes; determining the impact of changes on solution components; and
    making decisions on whether to change or maintain solution components.

13. The method of claim 9 wherein planning infrastructure maintenance further comprises
    assessing implementation efficiency; and
    optimizing operations and technology.

14. The method of claim 9 wherein refreshing tools and methodology further comprises
    performing a plurality of process reviews, the process reviews comprising
        assessing operations and information technology effectiveness; and
        modifying and updating tools for optimization.

15. The method of claim 9 wherein determining business and information technology standards further comprises
    selecting standards for reference architecture or technology to ensure interoperability;
    determining the business value and operational impact of the standards;
    mapping standards to the technical approach and components; and
    aligning the resources for the service-oriented business application through the adoption of the selected standards.

16. A computer-implemented method for assembling, operating, controlling, and maintaining a service-oriented business applications application over time, the business application comprised of multiple distributed services operating on multiple distributed computer servers connected over the Internet, the method comprising:
    selecting business functions and processes that define a corresponding service-oriented business application comprised of multiple distributed services operating on multiple distributed computer servers connected over the Internet;
    populating a business services catalog with components of the service-oriented business application by providing at least high level descriptions of services that implement the business functions and processes of the service-oriented business application;

developing and configuring the service-oriented business application;

testing and deploying the components of the service-oriented business application;

setting up and operating the service-oriented business application on at least a plurality of the computer servers, including at a first of the computer servers, one of the services of the business application, running on the first of the computer servers, receiving input, over the Internet, to a specified file, and at the first of the computer servers, the one of the services submitting the file, via the Internet, to another one of the services of the business application, running on a second of the computer servers, for processing; and maintaining the service-oriented business application over time;

wherein selecting business functions and processes further comprises:

identifying existing capabilities that can be re-used or re-purposed for use in other service-oriented business applications;

building a service-oriented business application portfolio of services from existing capabilities, and publishing the service-oriented business application portfolio in the business services catalog in computer readable storage on the at least one server.

17. The method of claim 16 wherein selecting business functions and processes further comprises analyzing a plurality of business processes and functions;

selecting common business functions and similar business functions by selecting components for the service-oriented business application with common and similar needs and resources; and adding new services to the service-oriented business application portfolio from third party sources or internal development.

18. The method of claim 16 wherein populating a business services catalog further comprises defining a plurality of service-oriented business applications and business services;

classifying the business services to develop a classification ontology;

extending the classification ontology as needed;

publishing the service-oriented business application and its business services into the business services catalog;

assigning metadata for the service-oriented business application and its business services, wherein the metadata identifies attributes about components that are employed to make them functional and interoperable in the service-oriented business application;

assigning role types, business events and exceptions; identifying additional third-party services and Web services;

identifying ecosystem partners, wherein the ecosystem partners correspond to a network of business relationships in a specific business area; and developing test harnesses for components of the service-oriented business application.

19. The method of claim 16 wherein developing and configuring the service-oriented business application further comprises at least one of:

developing Web services and portlets;

developing business process executive languages programs; developing business services;

developing test harnesses; publishing events and exceptions; assigning business policies;

defining and characterizing personalizable dimensions; assigning business policies;

defining and characterizing personalizable dimensions; and orchestrating the business services.

20. The method of claim 16 wherein testing and deploying components of the service-oriented business application further comprises:

deploying components of the service-oriented business application in a test environment;

performing completeness testing using simulated endpoints;

connecting to production services; and testing functionality by testing policies, events and exceptions, and personalization; performing non-functional testing;

deploying the service-oriented business application in a production environment; and assigning production endpoints for services published in the business services catalog that implement a Web service interface for the service-oriented business application on the at least one server.

21. The method of claim 16 wherein setting up and operating the service-oriented business application further comprises at least one of:

assigning business policies associated with the service-oriented business application;

creating organizations, roles and users associated with the service-oriented business application;

assigning business service level agreements associated with the service-oriented business application;

provisioning of business services associated with the service-oriented business application; and personalization of business services associated with the service-oriented business application.

22. The method of claim 16 wherein maintaining the service-oriented business application comprises at least one of:

monitoring business service level agreements associated with the service-oriented business application;

monitoring transactions associated with the service-oriented business application;

managing events and exceptions associated with the service-oriented business application;

measuring key business metrics associated with the service-oriented business application;

adjusting policies associated with the service-oriented business application as needed;

reporting on performance associated with the service-oriented business application; and changing management associated with the service-oriented business application.

23. The method of claim 1, further comprising:

at the second of the computer servers, said another one of the services formatting the file for the one of the services.

* * * * *